United States Patent [19]

Crass et al.

[11] Patent Number: 4,786,533
[45] Date of Patent: Nov. 22, 1988

[54] TRANSPARENT POLYPROPYLENE FILM FOR CANDY TWIST WRAPPING

[75] Inventors: Guenther Crass, Taunusstein; Lothar Bothe, Mainz-Gonsenheim, both of Fed. Rep. of Germany

[73] Assignee: Hoechst Aktiengesellschaft, Frankfurt am Main, Fed. Rep. of Germany

[21] Appl. No.: 915,083

[22] Filed: Oct. 3, 1986

[30] Foreign Application Priority Data

Oct. 4, 1985 [DE] Fed. Rep. of Germany ........ 3535472

[51] Int. Cl.$^4$ ............................................. B32B 27/00
[52] U.S. Cl. ..................................... 428/13; 428/349; 428/447; 428/516
[58] Field of Search .................. 428/13, 349, 447, 516

[56] References Cited

U.S. PATENT DOCUMENTS

| | | | |
|---|---|---|---|
| 4,029,827 | 6/1977 | Imperial et al. | 427/194 X |
| 4,230,767 | 10/1980 | Isaka et al. | 428/349 |
| 4,293,608 | 10/1981 | Isaka et al. | 428/349 X |
| 4,303,708 | 12/1981 | Gebhardt et al. | 428/349 X |
| 4,330,447 | 5/1982 | Lundberg et al. | 525/105 X |
| 4,340,641 | 7/1982 | Weiner | 428/349 |
| 4,348,457 | 9/1982 | Rosenthal et al. | 428/349 |
| 4,446,180 | 5/1984 | Schwab | 428/349 X |
| 4,460,631 | 7/1984 | Stegmeier et al. | 428/349 X |
| 4,502,263 | 3/1985 | Crass et al. | 428/349 X |
| 4,652,489 | 3/1987 | Crass et al. | 428/337 |
| 4,698,261 | 10/1987 | Bothe et al. | 428/204 |
| 4,716,068 | 12/1987 | Siefried et al. | 428/172 X |

FOREIGN PATENT DOCUMENTS 0079520 5/1983 European Pat. Off. .

OTHER PUBLICATIONS

Guenther Kuehne, "Verpacken mit Kunststoffen", Carl-Hanser-Verlag, Muenchen, p. 63 (1974).
Ullmans Enzyklopaedie der Technischen Chemie, Auflage 4, Band 2, pp. 539 through 553.
Ullmans Enzyklopaedie der Techn. Chemie, 4th Edition, vol. 12, pp. 525-555.

Primary Examiner—Henry F. Epstein
Attorney, Agent, or Firm—Foley & Lardner, Schwartz, Jeffery, Schwaab, Mack, Blumenthal & Evans

[57] ABSTRACT

A transparent propylene polymer film, produced by coextrusion and coated on one or both sides, for candy twist wrapping, wherein the propylene polymer base layer additionally contains a low molecular hydrocarbon resin in an amount of 10 to 40% by weight, based on the total weight of propylene polymer and resin, the base layer has a modulus of elasticity of not less than 3,000 N/mm$^2$, measured in both directions of molecular orientation, and each top layer contains a polydialkylsiloxane in an amount of 0.3 to 1.5% by weight, based on the weight of the top layer.

29 Claims, No Drawings

TRANSPARENT POLYPROPYLENE FILM FOR CANDY TWIST WRAPPING

BACKGROUND OF THE INVENTION

The invention relates to a transparent polypropylene film, produced by coextrusion and coated on one or both sides, for candy twist wrapping.

Twist wrapping is a particular method of closing complete wrappings for packaging of goods. This packaging method is particularly known in connection with the complete wrapping of relatively small goods items, including round or approximately round articles such as candies, bottles, candles, rolls of circular candies, chocolate bars, marzipan bars or the like.

A prerequisite for the use of twist wrapping is the suitability of the film, which must exhibit neither tear-starting nor tearing-off at the twist points, but on the other hand must be sufficiently stiff so that no shrinkage or crumpling occurs during twisting. According to the state of the art, it is predominantly cellophane, i.e. regenerated cellulose, non-oriented polypropolene or PVC film which are employed for candy wrappings. See, e.g., "Verpacken mit Kunststoffen" ["packing with plastics"] by Guenther Kuehne, published 1974, Carl-Hanser-Verlag, Munich, page 63.

SUMMARY OF THE INVENTION

It is therefore an object of the present invention to provide an improved packaging film.

Another object of the present invention is to provide a transparent film specifically for the twist wrapping of small goods, especially of candies.

A further object of this invention is to provide a film which can be produced more cheaply and therefore more economically.

It is also an object of the invention to provide a film which, after being twisted at the ends of a wrapped article, shows sufficient stability (rigidity) in the twisted form that during transportation and storage the contents of the package will not be released from the package by the film untwisting of its own accord.

Another object of the invention resides in the provision of an improved packaged article using the packaging film according to the invention.

In accomplishing the foregoing objects, there has been provided in accordance with one aspect of the present invention a transparent stretch oriented polymer film, comprising a base layer of a propylene polymer containing a low molecular weight hydrocarbon resin in an amount from about 10 to 40% by weight, calculated on the total weight of said base layer; and at least one polyolefinic top layer situated on said base layer and containing a polydialkylsiloxane in an amount of about 0.3 to 1.5% by weight, calculated on total weight of said cover layer, wherein said base layer has a modulus of elasticity of not less than about 3,000 N/mm$^2$ as measured in both directions of orientation.

In accordance with another aspect of the present invention, there has been provided a packaged article, comprising an article wrapped in a polymer film as defined above, wherein the polymer film is closed by twisting on at least one end of the packaged article.

Further objects, features and advantages of the present invention will become apparent from the detailed description of preferred embodiments which follows.

DETAILED DESCRIPTION OF PREFERRED EMBODIMENTS

The invention provides a film of the initially mentioned generic type, of which the characterizing features are that the polypropylene base layer additionally contains a low molecular weight hydrocarbon resin in an amount of about 10 to 40% by weight, based on the total weight of polypropylene and resin, that the base layer has a modulus of elasticity of not less than about 3,000N/mm$^2$, measured in both directions of molecular orientation, and that the top layer or layers contains or contain a polydialkylsiloxane in an amount of about 0.3 to 1.5% by weight, based on the weight of the top layer or layers.

Within the scope of the present invention, the polypropylene preferably employed for the base layer is an isotactic propylene homopolymer or a copolymer which is predominantly composed of propylene units. Such polymers usually have a melting point of not less than about 140° C., and preferably of not less than about 150° C. Isotactic polypropylene having an n-heptane-soluble content of less than about 15% by weight, copolymers of ethylene and propylene having an ethylene content of less than about 10% by weight, and copolymers of propylene with other alpha-olefins of 4 to 8 carbon atoms and containing less than about 10% by weight of these alpha-olefins are typical examples of the preferred thermoplastic polypropylene of the base layer.

The preferred thermoplastic polymers preferably have a melt flow index in the range from about 0.5 g/10 min. to 8 g/10 min. at 230° C. and 2.16 kg load (DIN 53,735, equivalent to ASTM-D 1238), and preferably from about 1.5 g/10 min. to 4 g/10 min.

The low molecular weight resin contained in the base layer is a natural or synthetic resin having a softening point of from about 60° to 180° C., preferably from about 80° to 130° C. (determined according to DIN 1995-U 4). Among the numerous low molecular weight resins, hydrocarbon resins are preferred, in particular in the form of petroleum resins, styrene resins, cyclopentadiene resins and terpene resins (these resins are described in Ullmanns Enzyklopaedie der Techn. Chemie [Ullmann's Encyclopedia of Industrial Chemistry], 4th edition, volume 12, pages 525 to 555).

The petroleum resins are hydrocarbon resins which are prepared by polymerization of deep-decomposed petroleum materials in the presence of a catalyst. These petroleum materials usually contain a mixture of resin-forming substances such as styrene, methylstyrene, vinyltoluene, indene, methylindene, butadiene, isoprene, piperylene and pentylene. The styrene resins are low molecular weight homopolymers of styrene or copolymers of styrene with other monomers, such as α-methylstyrene, vinyltoluene and butadiene. The cyclopentadiene resins are cyclopentadiene homopolymers or cyclopentadiene copolymers which are obtained from coal-tar distillates and fractionated natural gas. These resins are prepared by keeping the cyclopentadiene-containing materials at a high temperature for a long period. Dimers, trimers or oligomers can be obtained, depending on the reaction temperature.

The terpene resins are polymers of terpenes, i.e. hydrocarbons of formula $C_{10}H_{16}$, which are present in almost all ethereal oils or oil-containing resins in plants, and phenol-modified terpene resins. α-Pinene, β-pinene, dipentene, limonene, myrcene, camphene and similar terpenes may be mentioned as specific examples of the terpenes. The hydrocarbon resins can also be socalled modified hydrocarbon resins. In general, modification is effected by reaction of the raw materials before polymerization, by introduction of special monomers or by reaction of the polymerized product, hydrogenations or partial hydrogenations, in particular, being performed. Other hydrocarbon resins employed are styrene homopolymers, styrene copolymers cyclopentadiene homopolymers, cyclopentadiene copolymers and/or terpene polymers having, in each case, a softening point of 60° to 180° C., preferably 80° to 130° C. (in the case of the unsaturated polymers, the hydrogenated product is preferred).

The effective amount of low molecular weight resin is from about 10 to 40% by weight, and preferably from about 20 to 30% by weight, based on the total weight of polypropylene and resin.

Adding low molecular weight resins of the type described above in particular influences the modulus of elasticity of the base layer. The modulus of elasticity should in particular be in the range from about 3,000 to 4,500N/mm$^2$. It is determined according to DIN 53,457.

If the modulus of elasticity of the base layer is within the stated range, the film, in the twisted form, has the stability properties necessary for the intended end use.

The top layers applied to one or both sides of the polypropylene base film can be heat-sealable or coldsealable layers. They can also be non-sealable layers. All these layers may be present on one or both sides. The heat-sealing layer preferably consists of an ethylene homopolymer (high density polyethylene or low density polyethylene), a copolymer of propylene as the main component and ethylene, preferably in an amount of at most about 10% by weight (based on the copolymer), a copolymer of propylene as the main component and 1-butene, preferably in an amount of from about 10 to 15% by weight (based on the copolymer), a terpolymer of propylene, ethylene and an alpha-olefin with 4 to 10 carbon atoms, preferably a terpolymer of about 93.2 to 99.0% by weight of propylene, about 0.5 to 1.9% by weight of ethylene and about 0.5 to 4.9% by weight of an alpha-olefin with 4 to 10 carbon atoms, or a mixture of these polymers. The comonomers are present in substantially random distribution in the polymers.

The top layer or layers can also consist, like the base layer, of a propylene homopolymer, in which case the melt flow index of the polymer employed for the top layer should preferably be about from about 0.5 to 1.0 g/10 min. higher than the melt index of the polymer employed for the base layer. Suitable cold-sealing layers consist of polymers based on natural or synthetic rubber.

The polydialkylsiloxane introduced as an additive into the top layer or layers is preferably a polydialkylsiloxane which contains 1 to 4 carbon atoms in the alkyl group, polydimethylsiloxane being particularly preferred. The polydialkylsiloxane has a kinematic viscosity of from about 1,000 to 100,000 mm$^2$/sec at 25° C., and preferably of from about 5,000 to 50,000 mm$^2$/sec at 25° C. The amount of polydialkylsiloxane employed in the top layer or layers is from about 0.3 to 1.5% by weight, and preferably from about 0.5 to 1% by weight, based on the weight of the top layers.

The thickness of the film according to the invention is from about 15 to 40 μm, and preferably from about 20 to 30 μm, with the thickness of the top layer or layers being from about 0.2 to 4 μm, and preferably from about 0.5 to 3 μm for each particular top layer.

In order to further improve certain properties of the film according to the invention, both the base layer and the top layer or layers can contain appropriate additives in the particular active amount, with antistatic agents, stabilizers and nucleating agents being mentioned as preferred additives. In particular, to improve processability, from about 0.1 to 1% by weight, and preferably from about 0.2 to 0.5% by weight, of an organic or inorganic antiblocking agent can be added to the top layer or layers. Suitable antiblocking agents are, for example, incompatible organic polymers such as polyamide, polyester, polycarbonates and the like, or inorganic substances such as silicon dioxide and silicates, with aluminum silicate being particularly suitable.

The invention is explained further by reference to the following examples.

With the aid of the coextrusion process, multilayer films which had, in sum, a thickness of 1 mm, in each case, were extruded through a slot die having a width of 280 mm and a height of gap of 1.8 mm, at an extrusion temperature of 260° C. and a throughput of 70 kg/h. The film had a base layer formed of polypropylene having a melt flow index of 2 g/10 min and two outer layers of various compositions.

After passing through a 20 mm long air gap, these films were chilled on a chill roll at 30° C., which had a diameter of 600 mm and rotated at a circumferential speed of 4.5 m/min. From the chill roll, the films were then passed on to a tension isolation device consisting of three rolls, which also had a temperature of 30° C. and rotated at a circumferential speed of 4.5 m/min. The films were then heated to a temperature of 130° C. and longitudinally stretched by a factor of 5 by a further arrangement of three rolls. After stretching in the longitudinal direction, they were stretched 10-fold in the transverse direction, at an ambient temperature of 175° C. The multilayer films thus formed had a base layer of polypropylene and, on either side thereof, a sealing layer having a thickness of from about 0.5 to 0.8 μm. The total film thickness was 25 μm.

In the table which follows, the characteristics of the different multilayer films produced are compiled.

EXAMPLE 1

A three-layer transparent film having a total thickness of 25 μm was produced by coextrusion and subsequent stretch orientation and heat-setting. The top layers each had a thickness of 0.8 μm.

The base layer consisted of polypropylene with the addition of 25% by weight of ARKON P 125, based on the total weight of the mixture. The melt viscosity of the polypropylene employed was 3.5 g/10 min., determined according to DIN 53, 735 under 2.16 kg load. ARKON P 125 is a hydrogenated hydrocarbon resin having a softening point of 125° C.

The top layers also consisted of polypropylene to which an amount of 0.75% by weight of polydimethylsiloxane, based on the total weight of the mixture, had been added. The polydimethylsiloxane had a kinematic viscosity of 30,000 mm$^2$/sec. and the polypropylene of the top layers had a melt viscosity of 4 g/10 min., measured according to DIN 53,735 under 2.16 kg load.

COMPARATIVE EXAMPLE 1

A film was prepared as in Example 1, but without the addition of resin to the base layer and without the addition of polydimethylsiloxane to the top layers. The thickness of the film was again 25 μm.

COMPARATIVE EXAMPLE 2

A film was prepared as in Example 1, but without addition of resin to the base layer, the total thickness of the film consisting of the base layer and the two top layers being 25 μm.

COMPARATIVE EXAMPLE 3

A film was prepared as in Example 1, but without addition of polydimethylsiloxane to the top layers. The film thickness was again 25 μm.

COMPARATIVE EXAMPLE 4

A single-layer film was produced from polypropylene with addition of 25% by weight of AKRON P 125, based on the total weight of the mixture. The thickness of the single-layer film was 25 μm.

Evaluation

The processing characteristics of the films produced were assessed on candy wrapping machines. A slow wrapping machine (500 cycles/min., from Haensel) and a fast wrapping machine (1,200 cycles/min., from Nagema) were employed.

The wrapping properties were assessed in terms of the automatic untwisting of the twist-wrapped candies, the untwisting behavior on unpacking the candies and the degree of filling of candy bags of equal size.

The properties ascertained were rated as follows:
++ = very good, +-- = moderate, -- -- = poor.

TABLE

|  | Modulus of elasticity (N/mm$^2$) | | Processing characteristics in twist wrapping | | Quality of the twist wrap | | Packaging | |
| --- | --- | --- | --- | --- | --- | --- | --- | --- |
|  | lengthwise | crosswise | 500 cycles/min | 1,200 cycles/min | in respect of twist | in respect of opening | Filling process | Degree of filling |
| Example 1 | 3,500 | 4,500 | ++ | ++ | ++ | ++ | no problem | maximum |
| Comparative example 1 | 2,200 | 3,800 | -- -- | -- -- | -- -- | -- -- | breakdowns | minimum |
| Comparative example 2 | 2,200 | 3,600 | -- -- | -- -- | -- -- | -- -- | breakdowns | low |
| Comparative example 3 | 3,600 | 4,500 | ++ | ++ | ++ | ++ | aggregation | high |
| Comparative example 4 | 3,650 | 4,600 | ++ | ++ | ++ | ++ | aggregation | high |

What is claimed is:

1. A transparent stretch oriented polymer film, comprising:
    a base layer of a propylene polymer containing a low molecular weight hydrocarbon resin in an amount from about 10 to 40% by weight, calculated on the total weight of said base layer; and
    at least one polyolefinic top layer situated on said base layer and containing a polydialkylsiloxane in an amount of about 0.3 to 1.5% by weight calculated on total weight of said cover layer,
    wherein said base layer has a modulus of elasticity of not less than about 3,000N/mm$^2$ as measured in both directions of orientation.

2. A polymer film as claimed in claim 1, wherein the propylene polymer of the base layer has a melt flow index within the range from about 0.5 g/10 min to 8 g/10 min, measured according to DIN 53,735 under 2.16 kg load.

3. A polymer film as claimed in claim 2, wherein the propylene polymer of the base layer has a melt flow index within the range from about 1.5 g/10 min to 4 g/10 min, as measured according to DIN 53,735 under a 2.16 kg load.

4. A polymer film as claimed in claim 1, wherein said low molecular weight hydrocarbon resin of said base layer has a softening point within the range from about 60° to 180° C.

5. A polymer film as claimed in claim 4, wherein said low molecular weight hydrocarbon resin of said base layer has a softening point within the range from about 80° to 130° C.

6. A polymer film as claimed in claim 1, wherein said low molecular hydrocarbon resin of said base layer is selected from the group consisting of a petroleum resin, a styrene resin, a cyclopentadiene resin, or a terpene resin and combinations thereof.

7. A polymer film as claimed in claim 1, wherein the amount of said low molecular weight hydrocarbon resin of said base layer lies within the range from about 20 to 30% by weight calculated on total weight of said base layer.

8. A polymer film as claimed in claim 1, wherein the modulus of elasticity of said base layer lies within the range of from about 3,000–4,500N/mm$^2$.

9. A polymer film as claimed in claim 1, comprising a polyolefinic cover layer on each side of said base layer.

10. A polymer film as claimed in claim 1, wherein said cover layer is sealable.

11. A polymer film as claimed in claim 10, wherein said cover layer is heat-sealable.

12. A polymer film as claimed in claim 11, wherein said polyolefin resin of said cover layer is selected from the group consisting of ethylene homopolymer, a copolymer of propylene and ethylene, a copolymer of propylene and 1-butene, a terpolymer of propylene, ethylene, and an alpha olefin having 4–10 carbon atoms and combinations thereof.

13. A polymer film as claimed in claim 12, wherein said copolymer of propylene and ethylene is comprises predominantly propylene, with up to about 10% ethylene.

14. A polymer film as claimed in claim 12, wherein said terpolymer of propylene, ethylene, and an alphaolefin of said cover layer is comprised of about 93.2–99.0% by weight propylene, about 0.5–1.9% by weight ethylene, and about 0.5–4.9% by weight alpha olefin having 4–10 carbon atoms, calculated on total weight of said terpolymer.

15. A polymer film as claimed in claim 10, wherein said cover layer is cold-sealable.

16. A polymer film as claimed in claim 15, wherein said cold-sealable cover layer comprises a natural or synthetic rubber polymer.

17. A polymer film as claimed in claim 1, wherein said cover layer is non-sealable.

18. A polymer film as claimed in claim 17, wherein said non-sealable cover layer comprises a propylene homopolymer having a melt flow index which is about 0.5 to 1.0 g/10 min under a load of 2.16 kg higher than the melt flow index of the propylene polymer of the base layer.

19. A polymer film as claimed in claim 1, wherein said polydialkylsiloxane in said cover layer comprises a polydialkylsiloxane having from 1-4 carbon atoms in the alkyl group.

20. A polymer film as claimed in claim 19, wherein said polydialkylsiloxane has a kinematic viscosity within the range from about 1,000 to 100,000 mm$^2$/sec at 25° C.

21. A polymer film as claimed in claim 20, wherein said polydialkylsiloxane has a kinematic viscosity within the range about 5,000 to 50,000 mm$^2$/sec at 25° C.

22. A polymer film as claimed in claim 19, wherein said polydialkylsiloxane comprises polydimethylsiloxane.

23. A polymer film as claimed in claim 1, wherein said polymer film has a total thickness of from about 15 to 40 μm.

24. A polymer film as claimed in claim 1, wherein the thickness of each said top layer or layers is from about 0.2 to 4 μm.

25. A packaged article, comprising an article wrapped in a polymer film as defined by claim 1, wherein the polymer film is closed by twisting on at least one end of the packaged article.

26. A twist wrapper for small goods, comprising:
a base layer of a propylene polymer containing a low molecular weight hydrocarbon resin in an amount from about 10 to 40% by weight, calculated on the total weight of said base layer; and
at least one polyolefinic top layer situated on said base layer and containing a polydialkylsiloxane in an amount of about 0.3 to 1.5% by weight calculated on total weight of said cover layer,
wherein said base layer has a modulus of elasticity of not less than about 3,000N/mm$^2$ as measured in both directions of orientation.

27. A twist wrapper as claimed in claim 26, wherein said low molecular hydrocarbon resin of said base layer is selected from the groups consisting a petroleum resin, a styrene resin, a cyclopentadiene resin, a terpene resin and combinations thereof.

28. A twist wrapper as claimed in claim 26, wherein the amount of said low molecular weight hydrocarbon resin of said base layer lies within the range from about 20 to 30% by weight calculated on total weight of said base layer.

29. A twist wrapper as claimed in claim 26, wherein the modulus of elasticity of said base layer lies within the range of from about 3,000-4,500N/mm$^2$.

* * * * *